INVENTORS
MITSUYOSHI SHIMAZU
YASUZI SUZAKI

BY *Craig & Antonelli*

ATTORNEYS

United States Patent Office 3,564,451
Patented Feb. 16, 1971

3,564,451
PIVOTALLY ADJUSTABLE Q-SWITCHED LASER OPERATING IN THE FAR-INFRARED OR SUB-MILLIMETER REGION
Mitsuyoshi Shimazu, Mitaka-shi, and Yasuzi Suzaki, Tokyo, Japan, assignors to Hitachi, Ltd., Tokyo, Japan, a corporation of Japan
Filed Oct. 4, 1967, Ser. No. 672,861
Claims priority, application Japan, Oct. 11, 1966, 41/66,813
Int. Cl. H01s 3/00
U.S. Cl. 331—94.5
5 Claims

ABSTRACT OF THE DISCLOSURE

A laser device performing a Q-switch operation, wherein at least one of a pair of end parallel reflecting members composing a laser resonator is an orthogonal diherdral member. In this device, the right-angled edge of said reflecting member is placed vertically to the optical axis of the resonator and means are provided for rotating said member about an axis vertical to said right-angled edge and the optical axis and for rotating the same reflecting member slowly along the surface including said axis of vertical rotation and the optical axis with a point off said optical axis as a fulcrum.

---

This invention relates to a Q-switched laser device and more particularly to a laser device operating in the far-infrared or sub-millimeter region.

Figure 1:
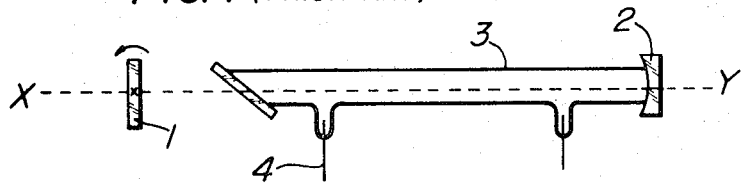

In a conventional laser device capable of producing a giant pulse laser output a high intensity laser output is produced by suddenly increasing the Q-value of the laser resonator thereon when the laser material has sufficiently been excited by pumping. In this device, as shown in FIG. 1, a laser material is contained in a case 3 which is placed between a rotating mirror (or a rotating right-angled prism) 1 and a concave mirror (or a plane mirror) 2, said two mirrors being separated by a suitable distance. When the atoms (or molecules) of said laser material are excited to a specified high energy level capable of laser oscillation by pumping said laser material and a resonator is instantaneously composed of said rotating mirror 1 and said reflecting mirror 2, a high intensity laser oscillation is obtained when said excited atoms undergo stimulated transitions to lower energy levels since the Q-value of the resonator rapidly increases to a high value.

Now, since the Doppler width of the spectral line of the oscillator is narrower in a long wavelength region like the far-infrared or submillimeter region than in a short wavelength region such as the visible or near infrared region. Thus, it is more difficult for a laser having a relatively long wavelength to fall within the Doppler width than a laser having a relatively short wavelength. Therefore, in order to oscillate a long wavelength laser one of the resonator mirrors must be moved finely along the optical axis of the resonator to obtain a resonance position. Q-switching is performed at such a position. However, it is usually quite complicated from a viewpoint of structure and adjustment, and requires a lot of skill to move the plane mirror or the concave mirror finely while holding said mirror perpendicular to the optical axis of the laser operating in a long wavelength region.

This invention is intended to obviate the deficiency described hereinabove and this invention makes use of the fact that the light incident on a 90° roof corner mirror is reflected exactly in the direction opposite to the incident direction irrespective of the angle of incidence.

According to the present invention there is provided a laser device comprising a discharge tube, and a pair of reflectors constituting an optical resonator, characterized in that one of the reflectors is a 90° roof corner mirror arranged such that it can move around a fixed axis offset from the optical axis of the discharge tube and substantially along the optical axis thereof, while the laser device further comprises means for finely adjusting the position of the roof corner mirror.

Figure 2A:
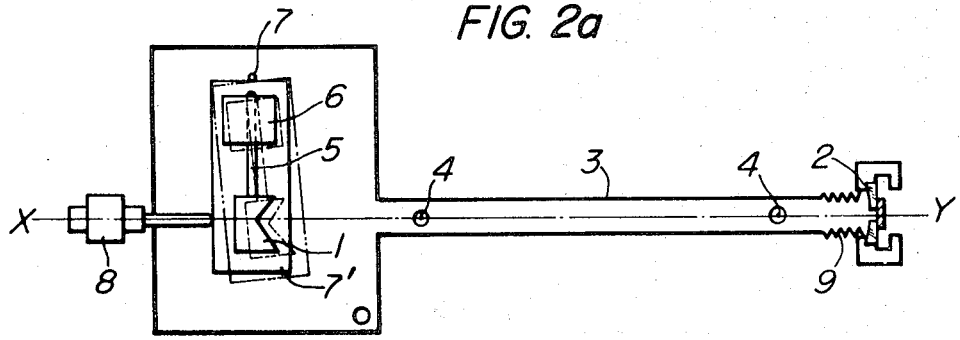
Figure 2B:
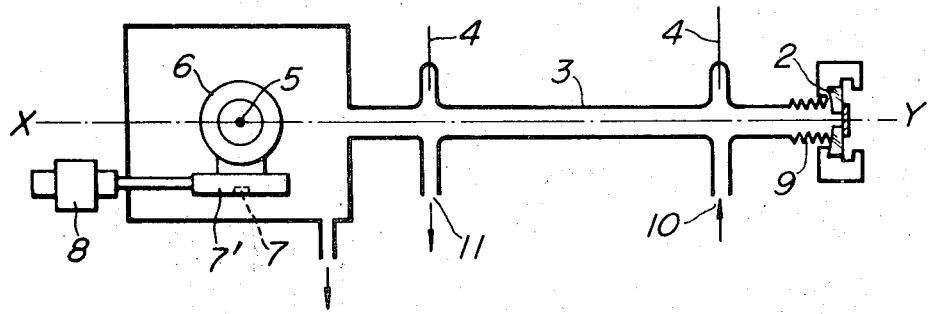

The invention will be described in more detail hereinbelow with reference to the accompanying drawings; wherein, FIG. 1 is a longitudinal sectional diagram of a conventional Q-switch laser device using gas, and FIGS. 2a and 2b are longitudinal and transverse sectional diagrams of a Q-switch laser device according to the present invention.

FIGS. 2a and 2b show an embodiment of the invention, wherein a 90° roof corner mirror 1 rotating at a high speed about an axis 5 of a motor 6 is arranged so that the roof top edge thereof may substantially be in a plane including the optical axis of a discharge tube 3. A plane or concave reflecting mirror 2 is provided on the other side of the gas discharge tube 3. Reference numeral 4 designates electrodes of the discharge tube 3, 8 indicates means for moving finely a support member 7' for the reflecting mirror 1 about a fulcrum 7. Number 9 shows a bellows which makes the end part of the discharge tube 3 to which the concave mirror 2 is provided movable, 10 is a gas inlet and 11 a gas outlet. The 90° roof corner mirror is moved about the fulcrum 7 together with the support member 7' arranged in the vertical plane for the purpose of tuning the resonator by moving the reflecting mirror 1 substantially along the optical axis XY. The support member 7' must be adjusted around the fulcrum 7 quite finely and, for example, a micrometer head is used for such rotation as shown in the figures. According to this construction, the adjustment of the resonator which allows the mode of the laser oscillation to fall within the Doppler width is quite readily compared with a conventional type device.

As is evident from the foregoing description, when the laser oscillator oscillates at a frequency $\lambda$, tuning of the resonator occurs every time the distance between the reflecting mirrors changes by $\lambda/2$ and a peak of the laser output is obtained.

Since the absorption of laser light my materials used to construct a laser device is great in the far-infrared or submillimeter region, it is desirable to suppress such an absorption loss of far-infrared or submillimeter laser light by making the laser device of the internal reflecting mirror type.

Further, the wavelength can be measured by measuring the distance of movement of the reflector with the micrometer. With a device as described hereinabove, laser oscillations in a long wavelength region can be obtained easily compared with conventional devices.

What is claimed is:

1. A laser device comprising a laser active material, means for pumping said laser active material to cause population inversion between two specific energy levels of said laser active material, a pair of reflectors disposed at opposite ends of said laser active material to form a laser optical resonator, one of which is a flat reflector and the other of which is a right angle reflector, means for tuning said optical resonator comprising means for pivotally adjusting said right angle reflector about a fixed axis parallel to the right angle edge of said right angle reflector and off the optical axis of said resonator, and means for rotating said right angle reflector about another axis perpendicular to said right angle edge independently of the pivotal adjustment.

2. A laser device according to claim 1, wherein said right angle reflector is a right-angle prism.

3. A laser device according to claim 1, wherein said laser device comprises an envelope for said laser active material and wherein said right-ankle reflector is disposed inside said envelope.

4. A laser device according to claim 1, wherein the spacing between the pair of reflectors is an integral number of half wavelengths of the radiation in the infrared region.

5. A laser device according to claim 1, wherein the spacing between the pair of reflectors is an integral number of half wavelengths of the radiation in the sub-millimeter region.

References Cited

UNITED STATES PATENTS

| 2,506,764 | 5/1950 | Bach | 88—1.5 |
| 3,229,224 | 1/1966 | Waly et al. | 331—94.5 |
| 3,393,374 | 7/1968 | Krumboltz | 331—94.5 |
| 3,426,294 | 2/1969 | Koester | 331—94.5 |

RONALD L. WIBERT, Primary Examiner

T. MAJOR, Assistant Examiner